United States Patent
Seiferth et al.

[15] 3,663,240
[45] May 16, 1972

[54] PACKAGE AND METHOD OF MAKING SAME

[72] Inventors: Oscar E. Seiferth; Paul E. Grindrod; Maurice J. Gifford; Glenn M. Austin, all of Madison, Wis.

[73] Assignee: Oscar Mayer & Co., Inc.

[22] Filed: Mar. 24, 1969

[21] Appl. No.: 809,497

[52] U.S. Cl.............................99/174, 99/171 M, 99/171 S, 99/171 LP, 99/178, 117/76 P, 117/122 R, 156/282, 161/251
[51] Int. Cl............................B65d 75/36, B32b 31/20
[58] Field of Search...............99/171 R, 174, 178, 171 LP; 161/25 B, 51, 53, 54, DIG. 2; 117/76 P; 156/282

[56] References Cited

UNITED STATES PATENTS

| | | | |
|---|---|---|---|
| 2,621,129 | 12/1952 | Ramsbottom | 99/174 X |
| 3,137,580 | 6/1964 | Sloan | 99/174 X |
| 3,228,168 | 1/1966 | Grindrod | 99/174 X |
| 3,445,324 | 5/1969 | Curler | 99/174 X |
| 3,454,158 | 7/1969 | Tigner | 99/174 X |
| 3,467,296 | 9/1969 | Anderson | 99/171 X |
| 3,491,935 | 1/1970 | Trotter | 161/252 X |

Primary Examiner—Frank W. Lutter
Assistant Examiner—William L. Mentlik
Attorney—Greist, Lockwood, Greenawalt & Dewey

[57] ABSTRACT

A hermetically sealed package material and method of making the same which includes a breakaway or peelable seal formed between first and second layers of packaging materials. The first layer of packaging material includes a backing member, preferably formed from lightweight paper stock, which is bonded to a saran film or coating while in a supercooled state by a suitable adhesive, such as, for example, an adhesive selected from the group consisting of styrene-butadiene latex compounds, vinyl printing inks, ethylene-vinyl acetate latex compounds, acrylonitrile-vinylidene chloride copolymers and other adhesive compounds exhibiting equivalent bonding characteristics with saran type films. The second layer of packaging material is formed from an ethylene-polar monomer copolymer film or coating material, such as, for example, an ethylene-vinyl acetate film, which is bonded to a suitable oxygen barrier material such as, for example, an oxygen barrier saran film. The peelable or breakaway seal is formed between the saran film or coating of the first layer of packaging material and the ethylene-polar monomer copolymer film or coating of the second layer of packaging film.

13 Claims, 6 Drawing Figures

PATENTED MAY 16 1972
3,663,240
SHEET 1 OF 2
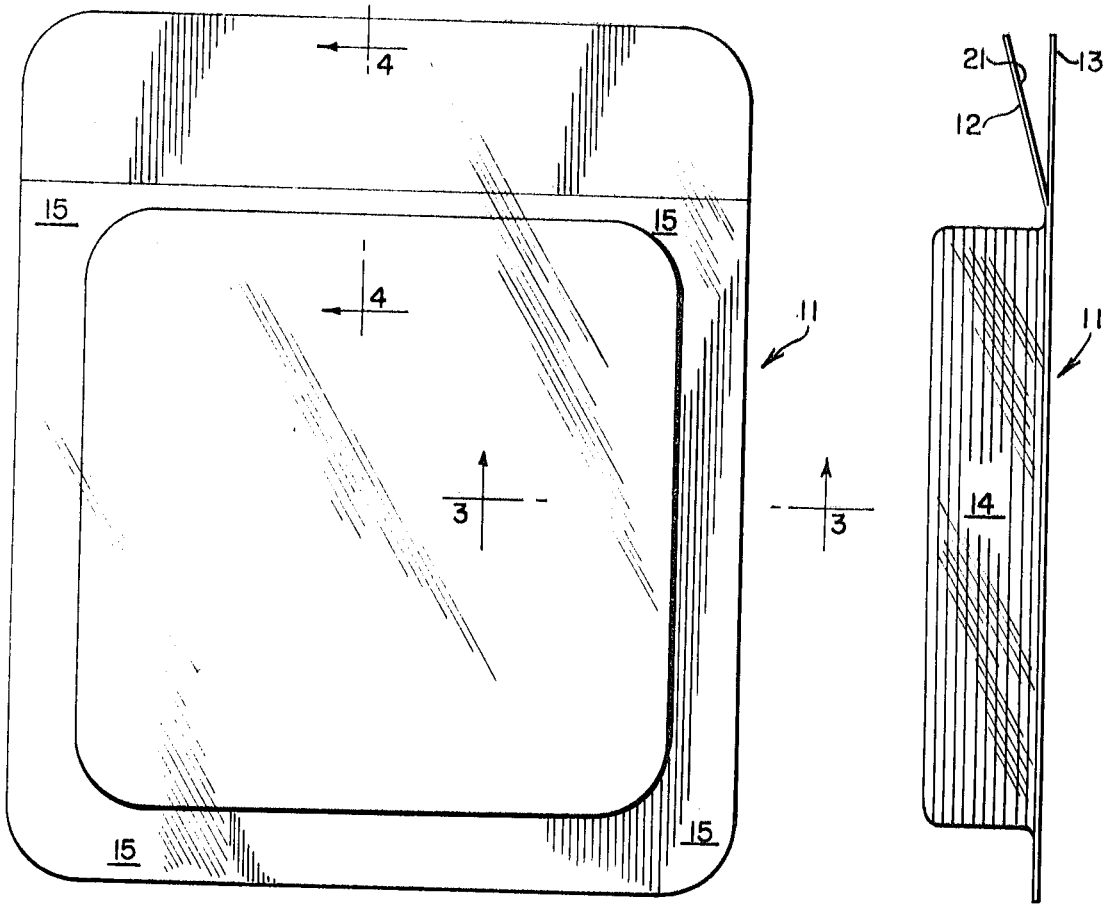
Fig. 1.
Fig. 2.
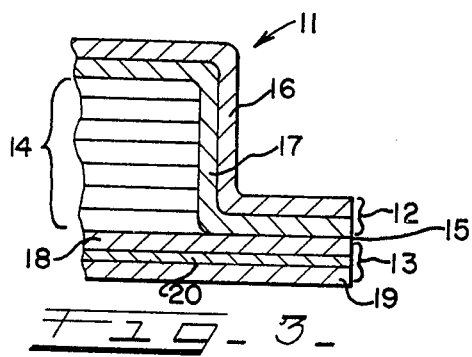
Fig. 3.
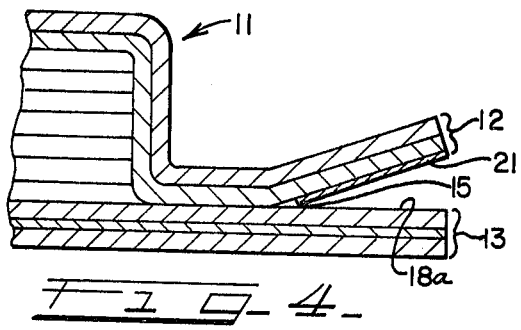
Fig. 4.
INVENTORS
OSCAR E. SEIFERTH
PAUL E. GRINDROD
MAURICE J. GIFFORD
GLENN M. AUSTIN
BY *Trask, Lockwood, Greenawalt & Dewey*
ATT'YS.

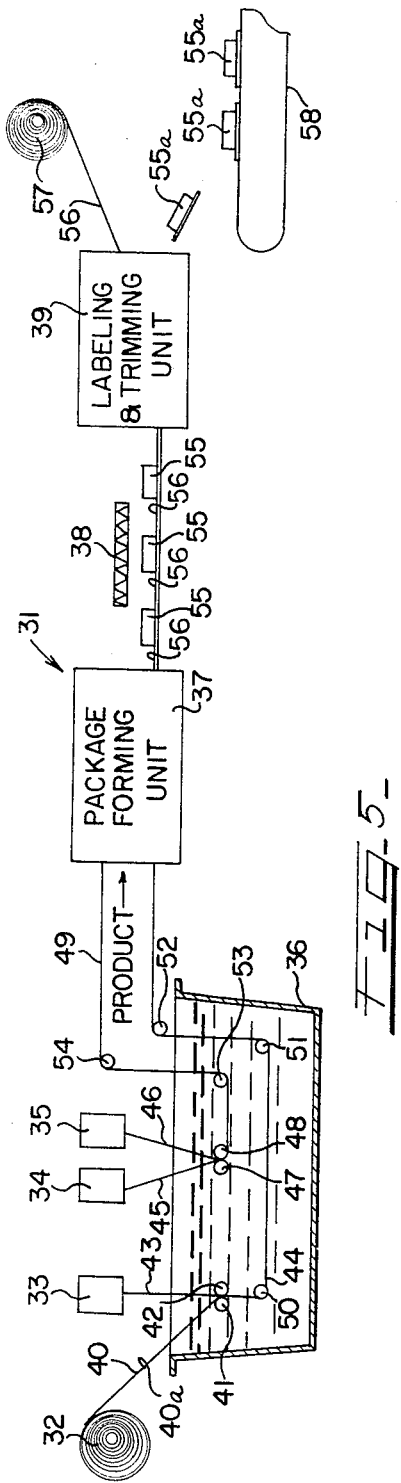
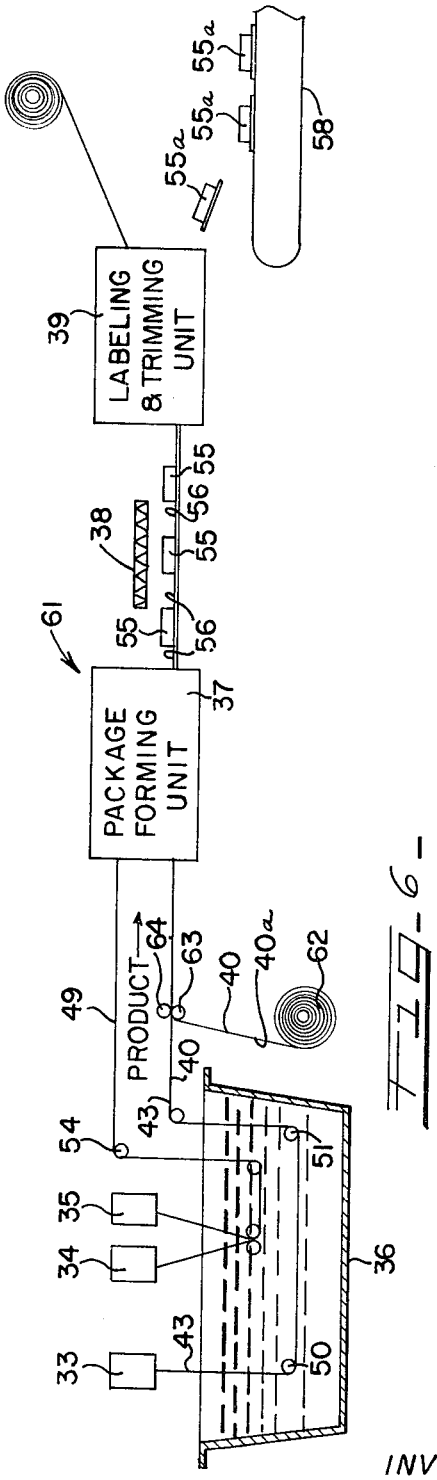

PACKAGE AND METHOD OF MAKING SAME

BACKGROUND AND DESCRIPTION OF THE INVENTION

The present invention generally relates to improved packages and methods of making the same which are characterized by hermetic seals that can be readily separated when access to the product is desired. More particularly, this invention is concerned with a new and improved package having a hermetic or peelable seal formed between an ethylene-polar monomer copolymer film or coating and a saran film which is bonded to a backing member by an adhesive interface.

An important embodiment of the present invention is specifically directed to a hermetic package for food products such as, for example, luncheon meat, wieners, sausage, bacon, cheeses and the like, which is characterized by an improved peelable or breakaway seal formed between an ethylene-vinyl acetate copolymer (hereinafter referred to as EVA) film or coating and a saran film which is contacted with the EVA film or coating while the saran is in an amorphous or supercooled state. The saran film forming the pealable or breakaway seal with the EVA film or coating is bonded to a suitable backing member, such as lightweight paper stock having a thickness of approximately 5 mils, through an adhesive which bonds and adheres to saran. Typically, such adhesives include styrene-butadiene latex compounds, vinyl printing inks, ethylene-vinyl acetate latex compounds, acrylonitrile-vinylidene chloride copolymers and materials equivalent thereto. The EVA film or coating forming the peelable seal with the saran film is likewise bonded to a suitable oxygen barrier film such as, for example, a polyvinylidene chloride-vinyl chloride copolymer film having a vinylidene chloride content of approximately 85 percent and a vinyl chloride content of approximately 15 percent by weight. Desirably, controlled amounts of heat, below the melt temperatures of the film materials constituting the package, can be applied to the seal area at the time of seal formation to improve the tenacity of the seal so formed without destroying its breakaway property or pealability.

As used in the specification, the term "breakaway seal" is used to define a seal wherein, at the time the seal is broken, either of the film materials which make up the seal separate either partially or entirely from the substrates to which they were respectively applied. The term "peelable seal" is used to denote a seal wherein both of the film materials which make up the seal, on seal separation, remain intact on the substrates to which they were respectively applied.

In accordance with the present invention, a new and improved package is provided with a peelable or breakaway seal without the use of a plasticizer or pressure sensitive adhesive. This seal is formed between an ethylene-polar monomer copolymer film or coating wherein the polar monomer content ranges from approximately 10 to 40 percent by weight and a saran film. While the ethylene-vinyl acetate copolymer is a preferred film material for practicing the present invention, other ethylene-polar monomer copolymer materials such as, for example, ethylene-isobutyl acrylate copolymer and ethylene-ethyl acrylate copolymer film materials will likewise produce an advantageous breakaway or peelable seal with a saran film.

As previously noted, in the preferred form of the present invention which is employed in packaging food products or other items which deteriorate upon contact with air, a suitable oxygen barrier film or coating is adhered to the ethylene-polar monomer copolymer film. In general, oxygen barrier films which can be advantageously combined with the ethylene-polar monomer copolymer films of the present invention preferably are transparent films which have an oxygen transmission rate of from 0 to 10 cubic cm., per 100 square inches, per 24 hours, per mil thickness at 77° F. and 760 mm. hg.

The improved packages of the present invention can be formed with a seal which closely conforms to the shape of the product shaped therein. Such a product-conforming seal results in the product being fixedly positioned within the package, thereby substantially minimizing damage to the package during shipment, and avoids the unsightly appearance produced by the free movement of water and food product juices loosely contained within he package. Furthermore, the amount of residual oxygen present in these packages is substantially reduced since they are provided with a maximum seal area which closely conforms to the product size.

It is, therefore, an important object of the present invention to provide an improved package and method of making the same, which package is characterized by a peelable or breakaway hermetic seal formed between an ethylene-polar monomer copolymer film or coating and a saran film which is adhered to a suitable backing member through the use of an adhesive characterized by an affinity for saran type film materials.

Another object of the present invention is to provide an improved flexible backed package and method of making the same, which package is characterized by hermetic peelable or breakaway seal formed between an ethylene-polar monomer copolymer film or coating and a saran film which is bonded to a suitable flexible backing member such as, for example, lightweight paper stock, through a suitable adhesive interface.

Another object of the present invention is to provide a new and improved package and method of making the same, which package has a peelable or breakaway hermetic seal formed between an ethylene-polar monomer copolymer film or coating and a saran film which is adhered to a backing member, which hermetic or breakaway seal was formed by contacting the ethylene-polar monomer copolymer film or coating with a saran film while simultaneously heating the seal interface therebetween to a temperature which is sufficiently high to provide improved seal tenacity but which temperature is below the melt temperature of any of the film materials in the package.

Another object of the present invention is to provide a new and improved method of making a package having a hermetic peelable or breakaway seal which method involves coating a backing member with a suitable adhesive and applying a saran type film material thereto which saran type film material is subsequently contacted with an ethylene-polar monomer copolymer film or coating.

Another object of the present invention is to provide a method of making a package having a hermetic peelable or breakaway seal formed between a paper backed saran film material and an ethylene-polar monomer copolymer film material which method involves supercooling the saran film material on the paper backing prior to contacting the same with the ethylene-polar monomer copolymer film or coating.

Other and further objects of the present invention will be apparent form the following detailed description thereof taken in conjunction with the accompanying drawings wherein:

FIG. 1 is a schematic plan view of a luncheon meat package embodying principles of the present invention;

FIG. 2 is a side elevational view of the package shown in FIG. 1;

FIG. 3 is an enlarged fragmentary sectional view, taken along the line 3—3 of FIG. 1;

FIG. 4 is an enlarged sectional view of the package taken along the line 4—4 of FIG. 1;

FIG. 5 is a diagrammatic illustration of a film extruding and packaging apparatus which can be used in making the packages of the present invention; and FIG. 6 is a diagrammatic illustration of a modified film extruding and packaging apparatus which can be used in making the improved packages of the present invention.

Referring to the drawings and with particular reference to FIGS. 1–4, the reference numeral 11 generally designates a package constructed in accordance with a preferred embodiment of the present invention. As is shown, package 11 is formed of upper and lower layers of packaging material 12 and 13 which are peripherally combined about a plurality of luncheon meat slices 14 to form a continuous edge seal 15 therealong. As is illustrated, the upper layer of packaging material 12 is drawn about the product 14 to conform to the general contour thereof and thereby provide the over all package with a surface conforming configuration without any folds or pleats which are potential problem areas since they are locations which can present leakage and contamination problems.

As is best shown in FIGS. 2 and 3, the top layer of packaging material 12 includes an outer oxygen barrier film 16 laminated to an inner film lamina 17 which, in accordance with a preferred embodiment of the present invention is composed of an EVA copolymer film material having a vinyl acetate content of approximately 10 to 40 percent by weight with the vinyl acetate content of from approximately 15 to 20 percent being particularly preferred. Suitable oxygen barrier films which can be used for film lamina 16 include the flexible saran type films such as, for example, films formed from vinylidene chloride-vinyl chloride copolymer film materials wherein the vinylidene chloride content is from approximately 60 to 90 percent by weight. Other film materials exhibiting oxygen barrier properties similar to such saran type films can be substituted in place thereof in film lamination 16. In accordance with the present invention, lower layer of packaging material 13 includes an upper lamina 18 which is composed of a saran film (i.e., a polyvinylidene chloride-vinyl chloride copolymer film wherein the vinylidene chloride content thereof predominates) which is bonded to a suitable flexible backing member 19 through an adhesive interface 20. Desirably, backing member 19 can be composed of paper or a similar material. In this regard and in accordance with an important aspect of the present invention, bonding of the saran lamina 18 to the backing member 19 is achieved through the use of an adhesive material which exhibits effective bonding properties with saran. Suitable adhesive compositions which can be employed include the styrene-butadiene latex compounds, vinyl printing inks, ethylene and vinyl acetate copolymer latex compounds, acrylonitrile-vinylidene chloride copolymers wherein the vinylidene chloride content is at least 60 percent by weight, and adhesives exhibiting similar bonding and adhering properties for saran type films.

Ready separation of the top layer of packaging material 12 from the lower layer of packaging material 13 is achieved through the provision of an insert 21 in the form of a coated paper or laminated material which does not bond with the upper surface 18a of the saran film lamina 18. As is best shown in FIG. 2, insert 21 is located adjacent the upper end of package 11 and enables the breakaway or peelable seal of the package illustrated in these figures to be opened without using a cutting implement. The saran films used in the upper and lower layers of packaging material 12 and 13, respectively, exhibit a so-called "supercooled" or amorphous state that can be advantageously utilized to enable such film laminations to be readily formed about a product being packaged. The properties and method of inducing this amorphous condition are fully described in co-owned U.S. Pat. Nos. 3,083,106, 3,189,505 and 3,131,069, among others. In particular, these unique supercooled properties are induced by immediately supercooling the films following extrusion by passing them through a water bath maintained at a temperature of 35° to 100° F. This amorphous condition can then be maintained until the combination of time and temperature produce crystallization therein.

Improved tenacity of the seal formed between the upper layer of packaging material 12 and lower layer of packaging material 13 can be achieved by heating the seal interface, at the time of seal formation, to a temperature of from approximately 80° to 200° F., which temperature is below the melt temperature of any of the film materials used in the package. This heating step advantageously promotes increased seal tenacity without destroying the peelable or breakaway characteristics of the seal thus formed. The use of such a heating step is readily distinguishable from conventional heat seal techniques in that with conventional heat seal techniques it is necessary to heat at least one of the materials at the interface to a temperature above its melting point in order to induce fusing thereof to the other material making up the heat seal.

FIG. 5 generally illustrates a continuous film-extruding and package-forming apparatus 31 which can be employed in the manufacture of packages employing principles of the present invention. As is shown, apparatus 31 generally includes a supply roll 32 and film extruders 33, 34 and 35, a super-cooling bath 36, package forming component 37, heater 38 and combination labeling and trimming unit 39.

As is shown, supply roll 32 feeds a web 40 of paper between a pair of laminating rollers 41 and 42 which are simultaneously fed with a saran film 43 from film extruder 33. In this embodiment, the web 40 of paper from supply roll 32 has a top surface 40a which is coated with a suitable adhesive which will readily bond with the saran lamina 43. Typically, suitable adhesive compositions include styrene-butadiene latex compounds, vinyl printing inks, ethylene-vinyl acetate latex compounds and acrylonitrile-vinylidene chloride copolymers. Other adhesive compositions exhibiting a similar affinity for saran will, of course, be apparent to those skilled in the art from the foregoing specific examples. Web 40 and film 43 are combined between laminating roller 41 and 42 into a packaging layer similar to the bottom layer 13 of the package shown and described in conjunction with FIGS. 1-4. Similarly, extruder 34 contains an ethylene vinyl acetate copolymer resin material which extrudes an EVA film 45 into the supercooling bath 36 while a second extruder 35 extrudes a suitable oxygen barrier film 46, such as a saran film, into the same bath. Films 45 and 46 are combined between laminating rollers 47 and 48 to provide a layer of packaging material 49 which is substantially similar to the upper layer of packaging material 12 in the package shown and described in conjunction with FIGS. 1-4.

The supercooling bath 36 is preferably maintained at a temperature of from approximately 35° to 100° F. When reduced to this temperature, the saran laminae 43 and 46 achieve the previously mentioned "supercooled" state.

As is shown, the lower layer of film packaging material 44 is directed around guide rollers 50, 51 and 52 into package forming unit 37. Similarly, the upper layer of film packaging material 49 is directed around guide rollers 53 and 54 into the same package forming unit. Simultaneously, product is fed to package forming unit 37 which is constructed in accordance with known techniques for handling saran films to provide product conforming packages therewith. Complete descriptions of typical package forming units are set forth is co-owned U.S. Pat. Nos. 3,083,106 and 3,129,545, the disclosures of which are incorporated herewith by reference thereto.

Individual product enclosing packages 55 emerge from the package forming unit 37 in a chain joined by continuous web 56. These packages can then be heated by a suitable heating element 38 to effect crystallization of the saran laminae. By way of example, the temperature of the saran laminae in the package can be raised to 150° F. for this purpose. It will be appreciated, however, that such crystallization can be obtained by permitting the packages to be stored at room temperature for an extended period of time.

The packages upon being thus formed are received in the combination labeling and trimming unit 39 wherein labels are applied thereto and they are separated from the web 56 which is received upon a suitable collecting roll 57. The separated packages 55a are then discharged from the unit 39 onto a conveyor 58 in condition for further handling, storage, or direct shipping.

In FIG. 6, like reference numerals have been used to designate components which are identical to and are operated in the same manner as those components shown and described in conjunction with the apparatus 31 of FIG. 5. In this regard, however, it will be noted that the web of paper backing material 40 is supplied from a supply roller 62 which is located downstream of the supercooling bath 36. In this manner, the adhesive surface 40a of web 40 is contacted with the saran film 43 between laminating rollers 63 and 64 while the saran film is in a supercooled state. Accordingly, the apparatus 61 offers the advantage of maintaining the web 40 in a dry condition by avoiding the need of passing the web 40 through a liquid in the supercooling bath 36.

While a preferred embodiment of the present invention has been described in detail, it will be apparent that certain modifications and variations thereof may be made without departing from the spirit and scope of this invention. Accordingly, only such limitations are to be imposed on this invention as are indicated in the appended claims.

We claim:

1. In a package having an improved hermetic breakaway or peelable seal defined by respective sealing surfaces of first and second layers of packaging material in contact with each other in which first and second layers of packaging material enclose a product therebetween, said seal-forming surface of said first layer of packaging material being composed of a saran film which is bonded to a backing member and said seal-forming surface of said second layer of packaging material being composed of an ethylene-polar monomer copolymer film material wherein the polar monomer content ranges from 10 to 40 percent by weight, the improvement wherein said saran film material is bonded to said backing member while in a supercooled state by an adhesive which is selected from the group consisting of styrene-butadiene latex compounds, vinyl printing inks, ethylene vinyl acetate latex compounds, and acrylonitrile-vinylidene chloride copolymers wherein the vinylidene chloride content is at least 60 percent by weight, said saran film having been initially contacted with said ethylene-polar monomer copolymer film to form said improved hermetic seal while in a supercooled state.

2. The package of claim 1 wherein said polar monomer of said ethylene-polar monomer copolymer film material is selected from the group consisting of vinyl acetate, isobutyl acrylate and ethyl acrylate.

3. The package of claim 1 wherein said seal forming surface of said second layer of packaging material is composed of ethylene-vinyl acetate copolymer film material having a vinyl acetate content of from about 15 to 20 percent by weight.

4. The package of claim 1 wherein said backing member is formed of paper.

5. The package of claim 1 wherein said hermetic seal was heated to a temperature of from 80° to 200° F. at the time said ethylene-polar monomer copolymer material was adhered to said saran film material.

6. In a package wherein a meat product is enclosed between first and second layers of packaging material, said package having an improved hermetic breakaway or peelable seal defined between respective sealing surfaces at first and second layers of said packaging material in contact with each other, said seal forming surface of said first layer of packaging material being composed of a saran film which is bonded to a backing member, and said seal forming surface of said second layer of packaging material being composed of an ethylene-polar monomer copolymer film material having a polar monomer content of approximately 10 to 40 percent by weight which is bonded to an oxygen barrier film, the improvement wherein said saran film is bonded to said backing member while in a super-cooled state by an adhesive which is selected from the group consisting of styrene-butadiene latex compounds, vinyl printing inks, ethylene vinyl acetate latex compounds, and acrylonitrile-vinylidene chloride copolymers, said saran film having been initially contacted with said ethylene-polar monomer copolymer film material to form said hermetic seal while being maintained in a supercooled state, whereby said package is characterized by an improved hermetic seal which can be readily separated when access to said meat product is desired.

7. The package of claim 6 wherein said polar monomer in said ethylene-polar monomer copolymer film material is selected from the group consisting of vinyl acetate, isobutyl acrylate and ethyl acrylate.

8. The package of claim 6 wherein said ethylene-polar monomer copolymer film material is an ethylene-vinyl acetate copolymer film wherein the vinyl acetate content is from 15 to 20 percent by weight.

9. A method of enclosing a product between a pair of packaging materials which can be readily separated when access to said product is desired, said method comprising the steps of inserting a product between first and second layers of packaging material, said first layer of packaging material having a lamina adjacent said product which is formed of a saran film, said saran film being bonded while in a supercooled state to a backing member by an adhesive selected from the group consisting of styrene-butadiene latex compounds, vinyl printing inks, ethylene-vinyl acetate latex compounds and acrylonitrile-vinylidene chloride copolymers, said second layer of packaging material having a lamina adjacent said product which is formed of an ethylene-polar monomer copolymer film material having a polar monomer content of from 10 to 40 percent by weight, said second layer of packaging material having an outer lamina formed of an oxygen barrier film, contacting said saran lamina with said ethylene-polar monomer copolymer film material about said product to form a hermetic seal which completely encloses said product between said first and second layers of packaging material.

10. The method of claim 9 wherein said saran lamina and said ethylene-polar monomer copolymer film lamina are heated to a temperature of from about 80° to 200° F. at the time of forming said seal.

11. The method of claim 9 wherein said backing member is supplied from a web.

12. The method of claim 11 wherein said web of backing material is contacted with said saran film in a supercooling bath maintained at a temperature of from 30° to 100° F.

13. The method of claim 11 wherein said web of backing material is contacted with said supercooled saran immediately after said saran film leaves a supercooling bath and prior to the time that it is placed in contact with said product.

* * * * *